United States Patent
Wallén et al.

(10) Patent No.: US 8,688,165 B2
(45) Date of Patent: Apr. 1, 2014

(54) TRANSMIT POWER CONTROL OF CHANNELS TRANSMITTED IN DIFFERENT FREQUENCY REGIONS

(75) Inventors: Anders Wallén, Ystad (SE); Bengt Lindoff, Bjärred (SE); Christian Bergljung, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 219 days.

(21) Appl. No.: 13/376,896

(22) PCT Filed: Jun. 10, 2010

(86) PCT No.: PCT/EP2010/058171
§ 371 (c)(1),
(2), (4) Date: Dec. 19, 2011

(87) PCT Pub. No.: WO2010/145987
PCT Pub. Date: Dec. 23, 2010

(65) Prior Publication Data
US 2012/0088538 A1  Apr. 12, 2012

Related U.S. Application Data

(60) Provisional application No. 61/187,743, filed on Jun. 17, 2009, provisional application No. 61/316,253, filed on Mar. 22, 2010.

(51) Int. Cl.
*H04W 52/04* (2009.01)
(52) U.S. Cl.
USPC ............................................. 455/522

(58) Field of Classification Search
USPC ........................................... 455/522; 370/318
See application file for complete search history.

(56) References Cited

U.S. PATENT DOCUMENTS

| 7,184,791 | B2* | 2/2007 | Nilsson et al. | 455/522 |
|---|---|---|---|---|
| 2006/0068831 | A1* | 3/2006 | Stewart et al. | 455/522 |
| 2010/0016010 | A1* | 1/2010 | Kashiwase et al. | 455/522 |
| 2011/0176498 | A1* | 7/2011 | Montojo et al. | 370/329 |
| 2012/0088538 | A1* | 4/2012 | Wall n et al. | 455/522 |

FOREIGN PATENT DOCUMENTS

| WO | 2008013259 A1 | 1/2008 |
|---|---|---|
| WO | 2008013286 A1 | 1/2008 |

* cited by examiner

*Primary Examiner* — Bobbak Safaipour
(74) *Attorney, Agent, or Firm* — Coats & Bennett, PLLC (57) ABSTRACT

A mobile terminal transmits one or more first communication channels in a first frequency region and one or more second communication channels in a second frequency region. With the channels experiencing different fading conditions, the terminal receives separate transmit power control (TPC) commands. Instead of simply adjusting the transmit power of the channels as commanded, the terminal computes a power offset indicative of the difference between the commanded power of one or more of the first channels and the commanded power of one or more of the second channels. The terminal then selectively performs transmit power control of the first and second channels on either an independent basis, according to the respective TPC commands, or a joint basis, depending on whether the computed power offset falls outside of a pre-determined range of values. In doing so, the terminal allows independent control of channels, while also mitigating self-interference and/or spectral emissions.

12 Claims, 7 Drawing Sheets

TRANSMIT POWER CONTROL OF CHANNELS TRANSMITTED IN DIFFERENT FREQUENCY REGIONS

This application claims priority to U.S. Provisional Application No. 61/187,743 filed Jun. 16, 2009 and to U.S. Provisional Application No. 61/316,253 filed Mar. 22, 2010, the contents of which are incorporated herein by reference in their entirety.

TECHNICAL FIELD

The present invention relates generally to controlling the power of communication channels, and particularly to controlling the power of those channels when separate power control commands are received for the channels.

BACKGROUND OF THE INVENTION

Transmit power control plays an important role in interference-limited communication networks, such as those based on Code Division Multiple Access (CDMA) technologies. Reliable communication and targeted levels of data throughput require transmission at sufficient power to insure adequate received signal quality, but transmitting at excess power is avoided as a mechanism to limit or otherwise reduce interference.

As one example of transmit power control, when a mobile terminal transmits an information signal over a communication channel to a base station, the base station feeds back transmit power control (TPC) commands to the mobile terminal. These TPC commands direct the mobile terminal to increase, decrease, or maintain the transmit power of the communication channel, as needed to keep the received signal quality at the base station at a targeted level over changing fading conditions.

Figure 1A:
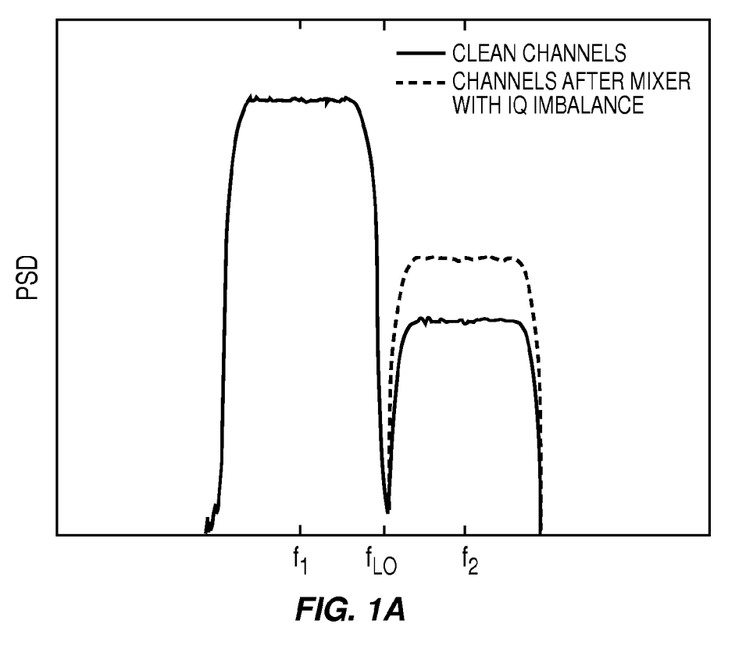
FIGS. 1A and 1B are graphs illustrating degradation occurring to channels transmitted in different frequency regions.
Figure 1B:
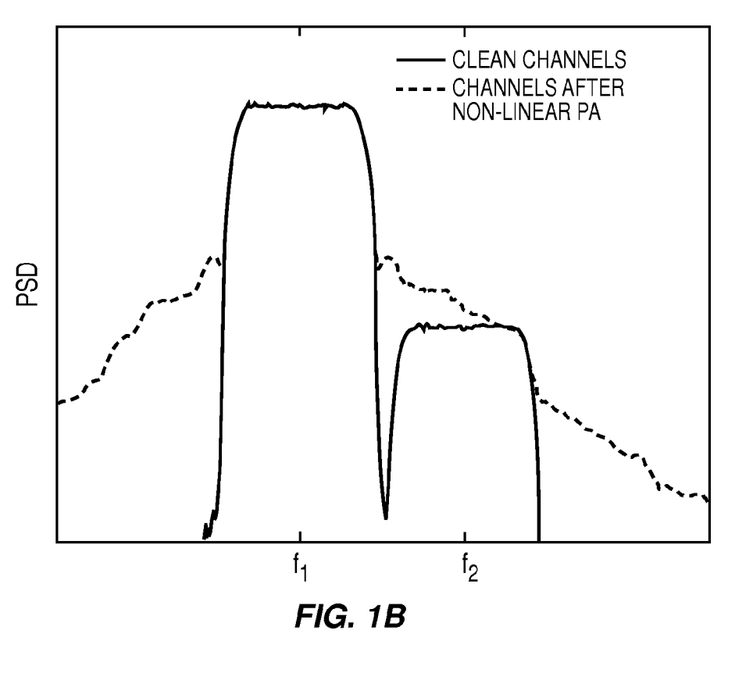

Some contexts complicate the above approach to transmit power control. For example, in Dual-Cell High-Speed Uplink Packet Access (DC-HSUPA) systems, a mobile terminal may simultaneously transmit two different communication channels on two different carriers (i.e., in two different frequency regions). Transmitted in different frequency regions, the channels may experience different fading conditions. Accordingly, the channels are independently power controlled, meaning that the mobile terminal receives separate TPC commands for them. As a result, however, the transmit power of one channel can become much greater than the transmit power of the other channel (e.g., in the case of soft handover between different base stations). When this happens in practice, non-linearities in power amplification and/or IQ imbalances in modulation cause the greater powered channel to leak into and interfere with the lesser powered channel. Such self-interference degrades the quality of the lesser powered channel. (See, for example, FIGS. 1A and 1B, which illustrate degradation of the lesser powered channel transmitted at frequency f2 due to interference from the greater powered channel transmitted at frequency f1).

A different, yet somewhat related complication arises in Long Term Evolution (LTE) systems, where a mobile terminal can simultaneously transmit the Physical Uplink Control Channel (PUCCH) and the Physical Uplink Shared Channel (PUSCH) in two different frequency regions. Transmitted in different frequency regions, the PUCCH and the PUSCH are independently power controlled in much the same way as described above. Here, though, complications arise mainly when the power of one channel is approximately the same as the power of the other channel. At relatively high power levels, intermodulation products may introduce significant spectral peaks outside of the two frequency regions allocated for the transmission. These unwanted spectral emissions may substantially interfere with other communication systems.

SUMMARY

Teachings herein advantageously provide independent transmit power control of communication channels transmitted in different frequency regions, to account for different fading conditions of the channels, unless and until too great or too small of a power offset between the channels would result. The teachings jointly control the channels' transmit power to prevent or at least discourage such a power offset, and thereby mitigate self-interference and/or spectral emissions.

More particularly, a mobile terminal includes a transmitter, a receiver, and one or more transmit power control (TPC) circuits. The transmitter is configured to transmit one or more first communication channels in a first frequency region and one or more second communication channels in a second frequency region. Transmitted in different frequency regions, the channels experience different fading conditions.

Accordingly, the receiver is configured to receive separate TPC commands for the one or more first communication channels and the one or more second communication channels. Yet instead of simply and naively adjusting the transmit power of the channels as commanded, the TPC circuit(s) compute a power offset indicative of the difference between the commanded power of one or more of the first communication channels and the commanded power of one or more of the second communication channels. The TPC circuit(s) then selectively perform transmit power control of the first and second communication channels on either an independent basis, according to the respective TPC commands received, or a joint basis, depending on whether the power offset falls outside of a pre-determined range of values.

In some embodiments, for example, the TPC circuit(s) are configured to perform transmit power control on an independent basis if the computed power offset is below a first pre-determined threshold value, and to otherwise perform transmit power control on a joint basis. This first threshold value may be pre-determined as the power offset at or above which an unacceptable level of self-interference would occur between the channels due to leakage of power between the channels (e.g., 20 dB). In other embodiments, the TPC circuit(s) are instead configured to perform transmit power control on an independent basis if the computed power offset is above a second pre-determined threshold value, and to otherwise perform transmit power control on a joint basis. The second threshold value may be pre-determined as the power offset at or below which an unacceptable level of spectral emissions would occur due to intermodulation products.

Other criteria in addition to whether the power offset falls outside of a pre-determined range of values may be specified. In various embodiments, the TPC circuit(s) perform transmit power control on an independent basis or a joint basis depending not only on whether the computed power offset falls outside of the pre-determined range of values, but also on whether the total power commanded across all, or substantially all, of the first and second communication channels exceeds a pre-determined total power threshold value.

When the TPC circuit(s) perform transmit power control on an independent basis, the power control loop for the first channels does not affect the power control loop for the second channels. The TPC circuit(s) thereby place no immediate restriction on the power offset with which the channels are actually transmitted. By contrast, when the TPC circuit(s) perform transmit power control on a joint basis, the power control loop for the first channels affects the power control loop for the second channels, or vice versa, and thereby restricts the power offset with which the channels are actually transmitted.

Performing transmit power control on a joint basis may entail, for example, controlling the transmit powers of the first and second channels according to the same TPC command, even though separate TPC commands were received. In doing so, the TPC circuit(s) adjust the transmit powers of the channels in substantially the same manner, and thereby prevent or at least discourage the power offset from being as large or as small as it would have been had the TPC circuit(s) adjusted the transmit powers as commanded. The TPC circuit(s) may of course perform transmit power control on a joint basis in other ways.

The present invention is therefore not limited to the above features and advantages. Indeed, those skilled in the art will recognize additional features and advantages upon reading the following detailed description, and upon viewing the accompanying drawings.

DETAILED DESCRIPTION

Figure 2:
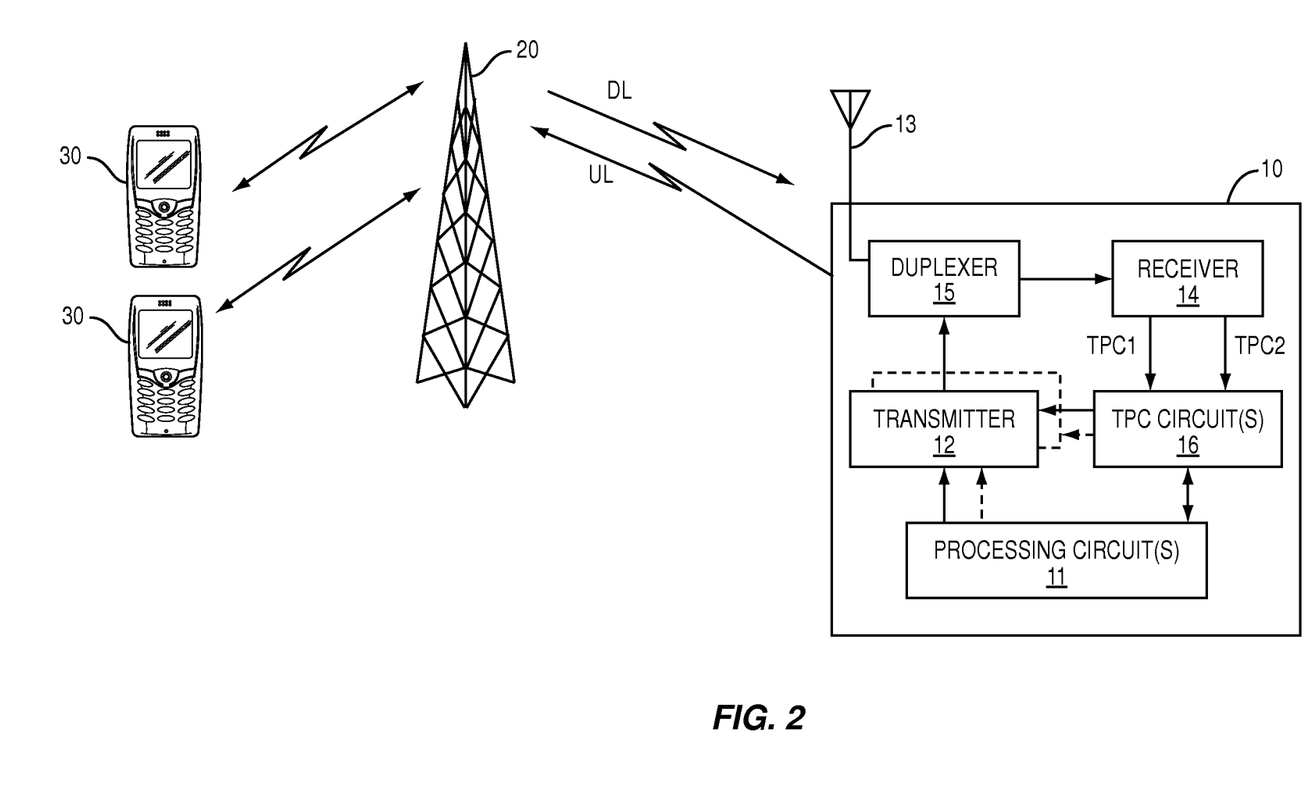
FIG. 2 is a block diagram of a mobile terminal according to one embodiment of the present invention.

FIG. 2 illustrates a mobile terminal 10 that is configured to wirelessly communicate with a base station 20. The mobile terminal 10 has communication links with the base station 20 in both the uplink (UL) and downlink (DL) directions. The mobile terminal 10 sends information to the base station 20 over communication channels defined on the uplink, and receives information from the base station 20 over communication channels defined on the downlink.

In particular, the mobile terminal 10 includes one or more transmitters 12 for sending information to the base station 20 (via one or more antennas 13). The transmitter(s) 12 are configured to send the information by transmitting one or more first communication channels $CH_1$ in a first frequency region $f_1$ and one or more second communication channels $CH_2$ in a second frequency region $f_2$ (where $f_1 \neq f_2$). Transmitted in different frequency regions, the channels $CH_1$ and $CH_2$ experience different fading conditions.

Because the channels $CH_1$ and $CH_2$ experience different fading conditions, the base station 20 generates transmit power control (TPC) commands for the one or more first communication channels $CH_1$ independently from generating TPC commands for the one or more second communication channels $CH_2$. The base station 20, for example, measures the quality at which it receives the one or more first communication channels $CH_1$, compares that quality to a first target quality, and generates TPC commands for the one or more first communication channels $CH_1$ as needed to achieve that first target quality. In a separate and unrelated process, the base station 20 measures the quality at which it receives the one or more second communication channels $CH_2$, compares that quality to a second target quality, and generates other TPC commands for the one or more second communication channels $CH_2$ as needed to achieve the second target quality. The base station 20 transmits these separate TPC commands to the mobile terminal 10 over a communication channel defined on the downlink.

The mobile terminal 10 correspondingly includes a receiver 14 configured to receive separate TPC commands for the one or more first communication channels $CH_1$ and the one or more second communication channels $CH_2$. The receiver 14 in turn provides these separate TPC commands ($TPC_1$ and $TPC_2$ in FIG. 2) to one or more TPC circuits 16 included in the mobile terminal 10.

In some embodiments, the TPC commands $TPC_1$, $TPC_2$ command the TPC circuit(s) 16 to increase or decrease the transmit power of the respective channels $CH_1$, $CH_2$ by a pre-determined amount relative to the transmit power set in a previous transmission time interval (that is, the TPC commands are relative commands). In other embodiments, the TPC commands $TPC_1$, $TPC_2$ command the TPC circuit(s) 16 to set the transmit power of the respective channels $CH_1$, $CH_2$ at a specified level (that is, the TPC commands are absolute commands). Whether the TPC commands $TPC_1$, $TPC_2$ are relative or absolute, though, the TPC circuit(s) 16 determine the transmit power at which it is commanded to set the channels $CH_1$, $CH_2$ (i.e., the commanded power of the channels $CH_1$, $CH_2$) based at least in part on those commands.

Yet instead of simply and naively adjusting the transmit power of the channels $CH_1$, $CH_2$ as commanded, the TPC circuit(s) 16 compute a power offset $P_{OFFSET}$ indicative of the difference between the commanded power of one or more of the first communication channels $CH_1$ and the commanded power of one or more of the second communication channels $CH_2$. The TPC circuit(s) 16 then selectively perform transmit power control of the first and second communication channels $CH_1$, $CH_2$ on either an independent basis, according to the respective TPC commands $TPC_1$, $TPC_2$ received, or a joint basis, depending on whether the power offset $P_{OFFSET}$ falls outside of a pre-determined range of values. By selectively performing transmit power control in this way, the TPC circuit(s) 16 allow the channels' transmit power to adjust separately as needed to account for different fading conditions, unless and until too great or too small of a power offset between the channels $CH_1$, $CH_2$ would result (whereupon the TPC circuit(s) 16 jointly control the channels' transmit power to prevent or at least discourage such a power offset).

Figure 3A:
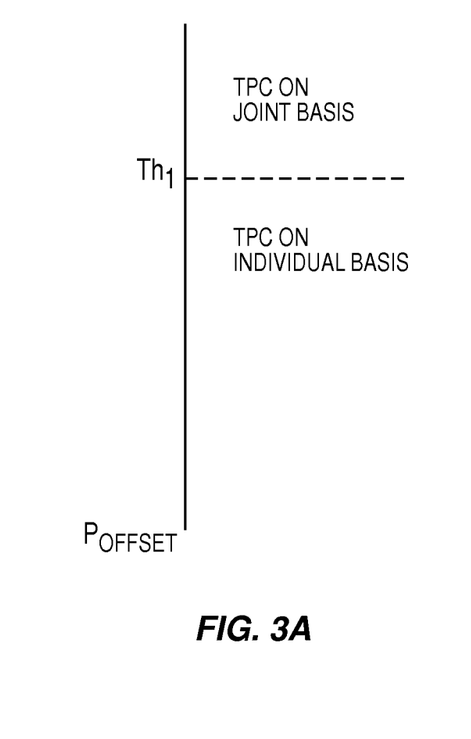
FIGS. 3A-3C are graphs illustrating different power offset ranges for selectively performing transmit power control on either an individual basis or a joint basis.

In some embodiments, for example, the TPC circuit(s) 16 are configured to perform transmit power control on an independent basis if the computed power offset $P_{OFFSET}$ is below a first pre-determined threshold value $Th_1$, as shown in FIG. 3A. The threshold value $Th_1$ may be pre-determined as the power offset at or above which an unacceptable level of self-interference would occur between the channels $CH_1$, $CH_2$ due to leakage of power between the channels (e.g., 20 dB). To prevent or discourage the channels $CH_1$, $CH_2$ from actually being transmitted with such a power offset, the TPC circuit(s) 16 are configured in these embodiments to perform transmit power control on a joint basis if the computed power offset $P_{OFFSET}$ is at or above this first pre-determined threshold value $Th_1$.

Figure 3B:
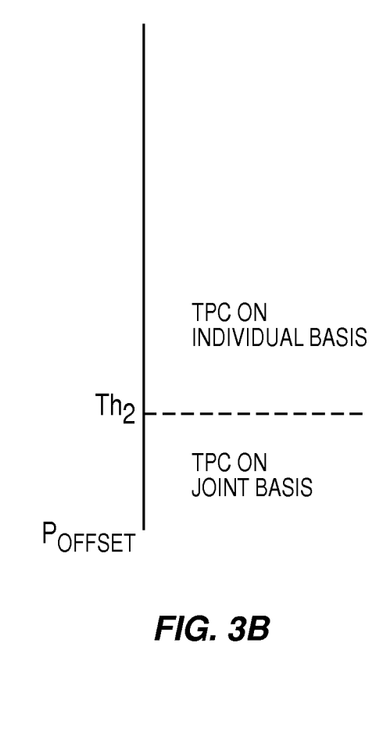

In other embodiments, the TPC circuit(s) 16 are instead configured to perform transmit power control on an independent basis if the computed power offset $P_{OFFSET}$ is above a second pre-determined threshold value $Th_2$, as shown in FIG. 3B. The threshold value $Th_2$ may be pre-determined as the power offset at or below which an unacceptable level of spectral emissions interfering with other mobile terminals 30 would occur due to intermodulation products. To prevent or discourage the channels $CH_1$, $CH_2$ from actually being transmitted with such a power offset, the TPC circuit(s) 16 are configured in these embodiments to perform transmit power control on a joint basis if the computed power offset $P_{OFFSET}$ is at or below the second pre-determined threshold value $Th_2$.

Figure 3C:
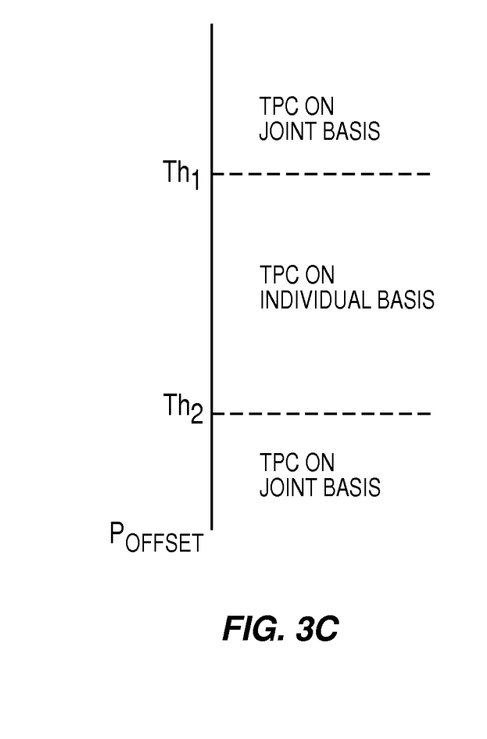

In still other embodiments, the TPC circuit(s) 16 are configured to perform transmit power control on an independent basis if the computed power offset $P_{OFFSET}$ is between the first and second pre-determined threshold values $Th_1$ and $Th_2$, as shown in FIG. 3C. Correspondingly, the TPC circuit(s) 16 are configured in these embodiments to perform transmit power control on a joint basis if the computed power offset $P_{OFFSET}$ is at or above the first pre-determined threshold value $Th_1$, or at or below the second pre-determined threshold value $Th_2$. Those skilled in the art will of course readily appreciate that such may entail computing one or more $P_{OFFSET}$ measures, and comparing different $P_{OFFSET}$ measures to different threshold values in order to determine whether transmit power control should be performed on an independent or joint basis.

The TPC circuit(s) 16 perform transmit power control on an independent basis as generally used herein by adjusting the transmit power of the first channels $CH_1$ independently from adjusting the transmit power of the second channels $CH_2$, as commanded by the respective TPC commands $TPC_1$, $TPC_2$. That is, the power control loop for the first channels $CH_1$ does not affect the power control loop for the second channels $CH_2$. With the transmit power of the channels $CH_1$, $CH_2$ being adjusted independently in this way, the TPC circuit(s) 16 place no immediate restriction on the power offset with which the channels $CH_1$, $CH_2$ are actually transmitted.

By contrast, the TPC circuit(s) 16 perform transmit power control on a joint basis, in general, by adjusting the transmit power of the first channels $CH_1$ with some dependence upon the adjustment to the transmit power of the second channels $CH_2$, or vice versa. In other words, the power control loop for the first channels $CH_1$ affects the power control loop for the second channels $CH_2$, or vice versa. With the transmit power of the channels $CH_1$, $CH_2$ being adjusted jointly in this way, the TPC circuit(s) 16 restrict the power offset with which the channels $CH_1$, $CH_2$ are actually transmitted, e.g., to prevent that power offset from being too large or too small.

In some embodiments, for example, the circuit(s) 16 perform transmit power control on a joint basis by controlling the transmit powers of the channels $CH_1$, $CH_2$ according to the same TPC command, even though separate TPC commands $TPC_1$, $TPC_2$ were received for the channels $CH_1$, $CH_2$. The circuit(s) 16 might for instance control the transmit power of both channels $CH_1$, $CH_2$ according to the TPC command received for the first channels $CH_1$, or alternatively according to the TPC command received for the second channels $CH_2$. Which TPC command to use for transmit power control may depend upon which of the channels $CH_1$, $CH_2$ has the higher signal quality or the like, but the result of effectively ignoring at least one of the received TPC commands $TPC_1$, $TPC_2$ is the same. In doing so, the TPC circuit(s) 16 adjust the transmit powers of the channels $CH_1$, $CH_2$ in substantially the same manner, and thereby prevent or at least discourage the power offset from being as large or as small as it would have been had the circuit(s) 16 adjusted the transmit powers as commanded.

The TPC circuit(s) 16 may of course perform transmit power control on a joint basis in other ways. Consider, for instance, embodiments where the mobile terminal 10 operates according to the Dual-Cell High-Speed Uplink Packet Access (DC-HSUPA) standards. So configured, the transmitter(s) 12 simultaneously transmit the one or more first communication channels $CH_1$ on a first carrier (i.e., in a first frequency region) and the one or more second communication channels $CH_2$ on a second carrier (i.e., in a second frequency region). The one or more first communication channels $CH_1$ transmitted on the first carrier may include a first dedicated physical control channel (DPCCH), a first dedicated physical data channel (DPDCH), a first enhanced dedicated physical control channel (E-DPCCH), a first enhanced dedicated physical data channel (E-DPDCH), and/or a first high-speed dedicated physical control channel (HS-DPCCH). Likewise, the one or more second communication channels $CH_2$ transmitted on the second carrier may include a second DPCCH, a second DPDCH, a second E-DPCCH, a second E-DPDCH, and/or a second HS-DPCCH.

The receiver 14 receives TPC commands $TPC_1$ that directly control the first DPCCH, but that ultimately control all or substantially all of the other first communication channels $CH_1$ (since gain factors set the transmit power of the first DPDCH, E-DPCCH, E-DPDCH, and HS-DPCCH relative to the transmit power of the first DPCCH). Similarly, the receiver 14 receives separate TPC commands $TPC_2$ that directly control the second DPCCH, but that ultimately control all or substantially all of the other second communication channels $CH_2$ (since gain factors set the transmit power of the second DPDCH, E-DPCCH, E-DPDCH, and HS-DPCCH relative to the transmit power of the second DPCCH). The receiver 14 then provides these TPC commands $TPC_1$, $TPC_2$ to the TPC circuit(s) 16.

Provided with these TPC commands, as well as the gain factors discussed above, the TPC circuit(s) 16 in some embodiments compute the power offset $P_{OFFSET}$ as indicating the difference between (1) the commanded power of the first DPCCH, DPDCH, E-DPCCH, E-DPDCH, and HS-DPCCH (that is, the total power commanded on the first carrier); and (2) the commanded power of the second DPCCH. If that power offset $P_{OFFSET}$ falls outside of a pre-determined range of values (e.g., above the first threshold value $Th_1$), the TPC circuit(s) 16 perform transmit power control on a joint basis by controlling the transmit power of the first DPCCH according to $TPC_1$ and controlling the transmit power of the second DPCCH according to $TPC_2$, but adjusting the gain factors of the first DPDCH, E-DPCCH, E-DPDCH, and/or HS-DPCCH as needed for the computed power offset $P_{OFFSET}$ to fall within the pre-determined range of values.

Alternatively, the TPC circuit(s) 16 in other embodiments simply adjust the gain factors of the first DPDCH, E-DPCCH, E-DPDCH, and/or HS-DPCCH to counteract any commanded increase or decrease in the transmit power of the first DPCCH (and thereby keep the total transmit power of the first carrier constant). In doing so, the TPC circuit(s) 16 at least discourage the power offset from being as large or as small as it would have been had the circuit(s) 16 adjusted the transmit powers as commanded, in accordance with the TPC commands and the gain factors.

The TPC circuit(s) 16 in yet other embodiments compute the power offset $P_{OFFSET}$ as indicating the difference between (1) the commanded power of the first DPCCH, DPDCH, E-DPCCH, E-DPDCH, and HS-DPCCH (that is, the total power commanded on the first carrier); and (2) the commanded power of the second DPCCH, DPDCH, E-DPCCH, E-DPDCH, and HS-DPCCH (that is, the total power commanded on the second carrier). If that power offset $P_{OFFSET}$ falls outside of a pre-determined range of values (e.g., above the first pre-determined threshold $Th_1$), the TPC circuit(s) 16 perform transmit power control on a joint basis by controlling the transmit power of the first DPCCH according to $TPC_1$ and controlling the transmit power of the second DPCCH according $TPC_2$, but adjusting the gain factors of the first and/or second DPDCH, E-DPCCH, E-DPDCH, and/or HS-DPCCH as needed for the computed power offset $P_{OFFSET}$ to fall within the pre-determined range of values, or to counteract any commanded increase or decrease in the transmit power of the first or second DPCCH.

The TPC circuit(s) 16 in still other embodiments perform transmit power control on a joint basis by controlling the transmit power of the first DPCCH, as well as the transmit power of the second DPCCH, according to the same TPC command, as previously suggested. The TPC command may be either $TPC_1$ or $TPC_2$, depending for example on which of the first DPCCH or the second DPCCH has the higher signal quality, or which of the first carrier or the second carrier is assigned as the primary carrier.

Heretofore, the TPC circuit(s) 16 have been described as performing transmit power control on an independent basis or a joint basis depending solely on whether the computed power offset $P_{OFFSET}$ falls outside of the pre-determined range of values. It should be understood, though, that such may further depend on other criteria. In a number of embodiments, for example, the TPC circuit(s) 16 perform transmit power control on an independent basis or a joint basis depending not only on whether the computed power offset $P_{OFFSET}$ falls outside of the pre-determined range of values, but also on whether the total power commanded $P_{TOT}$ across all, or substantially all, of the first and second communication channels $CH_1$, $CH_2$ exceeds a pre-determined total power threshold value $Th_{TOT}$.

Consider, for instance, embodiments where the mobile terminal 10 operates according to the Long Term Evolution (LTE) standards. So configured, the transmitter(s) 12 simultaneously transmit a Physical Uplink Control Channel (PUCCH) as a first communication channel $CH_1$ in a first frequency region and a Physical Uplink Shared Channel (PUSCH) as a second communication channel $CH_2$ in a second frequency region. The transmitter(s) 12 may transmit the PUCCH and the PUSCH on the same or different carriers, but in any event transmit them in different frequency regions. Several different frequency regions for the PUCCH and the PUSCH may be used simultaneously.

The receiver 14 receives TPC commands $TPC_1$ that directly control the PUCCH and receives separate TPC commands $TPC_2$ that directly control the PUSCH. Provided with these TPC commands $TPC_1$, $TPC_2$, the TPC circuit(s) 16 compute the power offset $P_{OFFSET}$ as indicating the difference between the commanded power of the PUCCH and the commanded power of the PUSCH. The TPC circuit(s) 16 also compute the total commanded power $P_{TOT}$ across the PUCCH and the PUSCH, which may simply be the sum of the commanded power of the PUCCH and the commanded power of the PUSCH.

Even if the power offset $P_{OFFSET}$ falls outside of a pre-determined range of values (e.g., below the second pre-determined threshold $Th_2$), the TPC circuit(s) 16 nonetheless perform transmit power control on an independent basis if the total commanded power $P_{TOT}$ does not exceed the total power threshold $Th_{TOT}$. Likewise, even if the total commanded power $P_{TOT}$ exceeds the total power threshold $Th_{TOT}$, the TPC circuit(s) 16 still perform transmit power control on an independent basis if the power offset $P_{OFFSET}$ does not fall outside of the pre-determined range of values. Indeed, in these embodiments, an unacceptable level of spectral emissions only occurs if both the power offset $P_{OFFSET}$ falls outside of the pre-determined range of values and the total commanded power $P_{TOT}$ exceeds the total power threshold $Th_{TOT}$. Thus only in that case do the TPC circuit(s) 16 perform transmit power control on a joint basis.

Figure 4A:
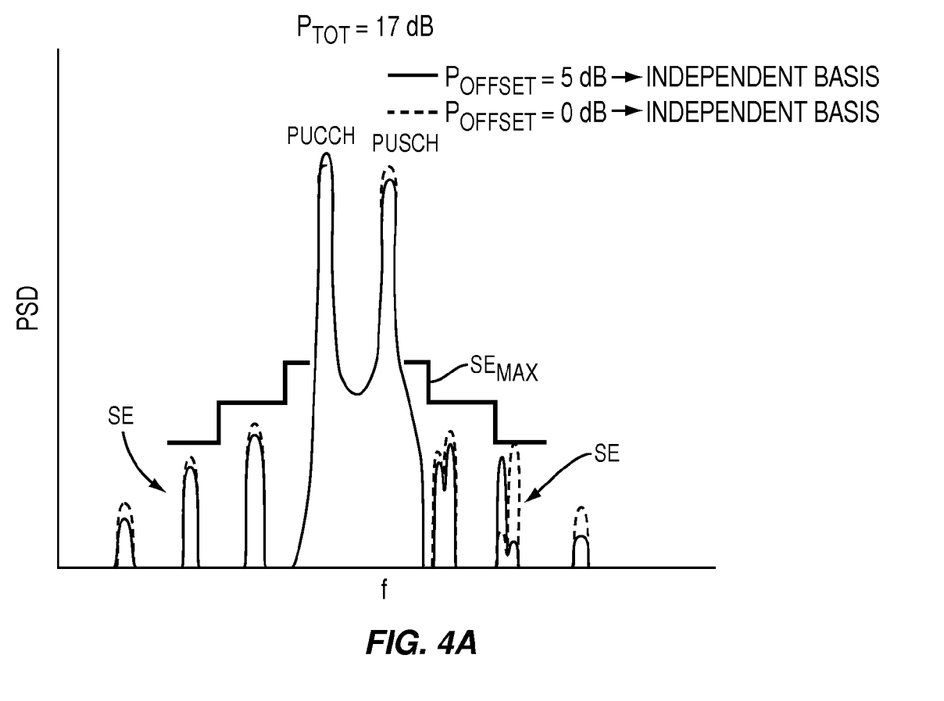
FIGS. 4A-4B are graphs illustrating conditions under which transmit power control is performed on a joint basis according to some embodiments of the present invention.
Figure 4B:
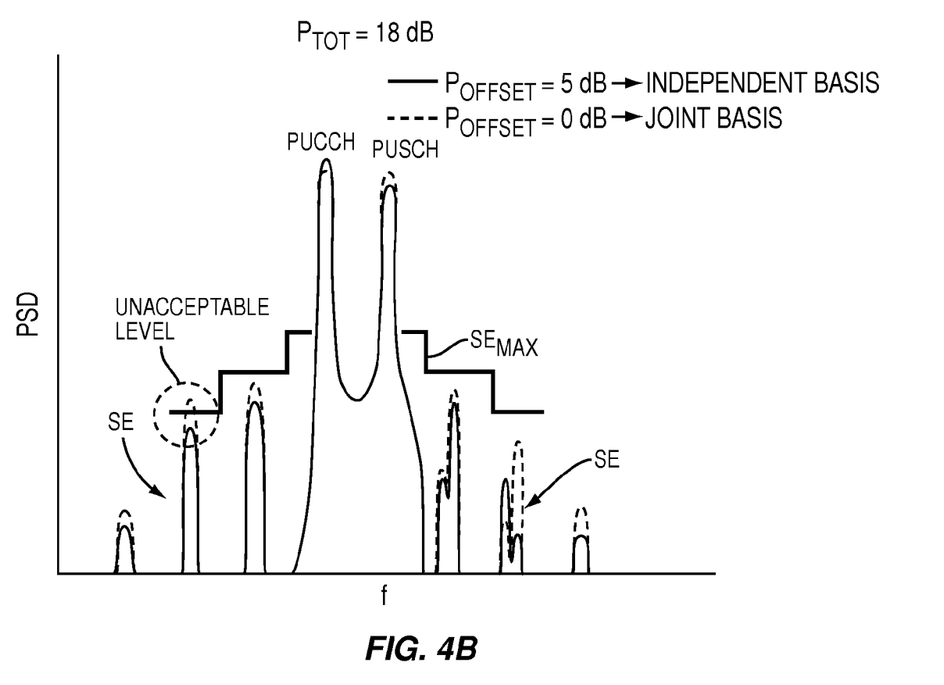

FIGS. 4A-4B illustrate an example of this for two different total commanded powers $P_{TOT}$=17 dBm and $P_{TOT}$=18 dBm, and for two different power offsets $P_{OFFSET}$=5 dB and $P_{OFFSET}$=0 dB. As shown in FIG. 4A, when the PUCCH and the PUSCH are transmitted with $P_{TOT}$=17 dBm and with either $P_{OFFSET}$=5 dB or $P_{OFFSET}$=0 dB, the resulting spectral emissions SE do not violate a pre-determined maximum level $SE_{max}$. In either of these cases, therefore, the TPC circuit(s) 16 may perform transmit power control on an independent basis. By contrast, FIG. 4B shows that when the PUCCH and the PUSCH are transmitted with $P_{TOT}$=18 dBm, the resulting spectral emissions SE violate the pre-determined maximum level $SE_{max}$ when $P_{OFFSET}$=0 dB, but not when $P_{OFFSET}$=5 dB. Accordingly, in one embodiment, the TPC circuit(s) 16 perform transmit power control on an independent basis when $P_{OFFSET}$=5 dB, and on a joint basis when $P_{OFFSET}$=0 dB. This example may of course be extended to generally state the proposition above, that is that the TPC circuit(s) 16 perform transmit power control on a joint basis if both the power offset $P_{OFFSET}$ falls outside of a pre-determined range of values and the total commanded power $P_{TOT}$ exceeds a per-determined total power threshold $Th_{TOT}$.

The TPC circuit(s) 16 may perform transmit power control on a joint basis by controlling the transmit power of the PUCCH, as well as the transmit power of the PUSCH, according to the TPC command $TPC_1$ received for the PUCCH (which has a higher priority than the PUSCH). In doing so, the TPC circuit(s) 16 prevent or at least discourage the power offset from being as large or as small as it would have been had the circuit(s) 16 adjusted the transmit powers as commanded. Alternatively, the TPC circuit(s) 16 might control the transmit power of the PUCCH according to the TPC command $TPC_1$ received for the PUCCH, but unconditionally reduce the transmit power of the PUSCH (i.e., regardless of the TPC command $TPC_2$ received for the PUSCH). In doing so, the TPC circuit(s) 16 prevent or at least discourage the total power of the PUCCH and the PUSCH from exceeding the total power threshold $Th_{TOT}$. In some embodiments, if the transmit power of the PUSCH would be unconditionally reduced below some minimum power level (which may occur as the requested PUCCH power increases), the TPC circuit(s) 16 set the transmit power of the PUSCH to zero so that it is not transmitted at all.

Note that the pre-determined range of values for selecting whether to perform transmit power control on either an individual basis or a joint basis may depend on the frequency regions in which the first and second communication channels $Ch_1$, $CH_2$ are transmitted. In particular, the second pre-determined threshold $Th_2$ (described above as being the power offset at or below which an unacceptable level of spectral emissions would occur) may depend on the first and second frequency regions. Indeed, for a given power offset (and total power), spectral emissions are typically more severe the greater the displacement between the first frequency region and the second frequency region. Accordingly in some embodiments, the second pre-determined threshold $Th_2$ increases with increasing displacement between the first and second frequency regions.

Indeed, in general, when the first and second frequency regions are displaced by any amount, so as to be non-contiguous frequency regions, the second pre-determined threshold $Th_2$ and the total power threshold $Th_{TOT}$ may be the thresholds which dictate selective performance of transmit power control. When the first and second frequency regions are contiguous, on the other hand, the first pre-determined threshold $Th_1$ may instead be the threshold which dictates selective performance of transmit power control. Accordingly, different thresholds may be used for different frequency allocations of (i.e., different frequency distances between) the first and second communication channels $CH_1$, $CH_2$.

Those skilled in the art will appreciate that the above described transmit power control occurs on an ongoing basis, such as once every slot. Hysteresis may therefore be introduced to prevent a ping-pong effect between performing transmit power control on an individual basis and performing transmit power control on a joint basis. For example, the TPC circuit(s) 16 may perform transmit power control on an independent basis until the computed power offset $P_{OFFSET}$ falls outside of the pre-determined range of values, whereupon the circuit(s) 16 perform transmit power control on a joint basis. Only when the computed power offset $P_{OFFSET}$ falls back within the pre-determined range by a pre-determined amount do the TPC circuit(s) 16 resume performing transmit power control on an independent basis.

Figure 5:
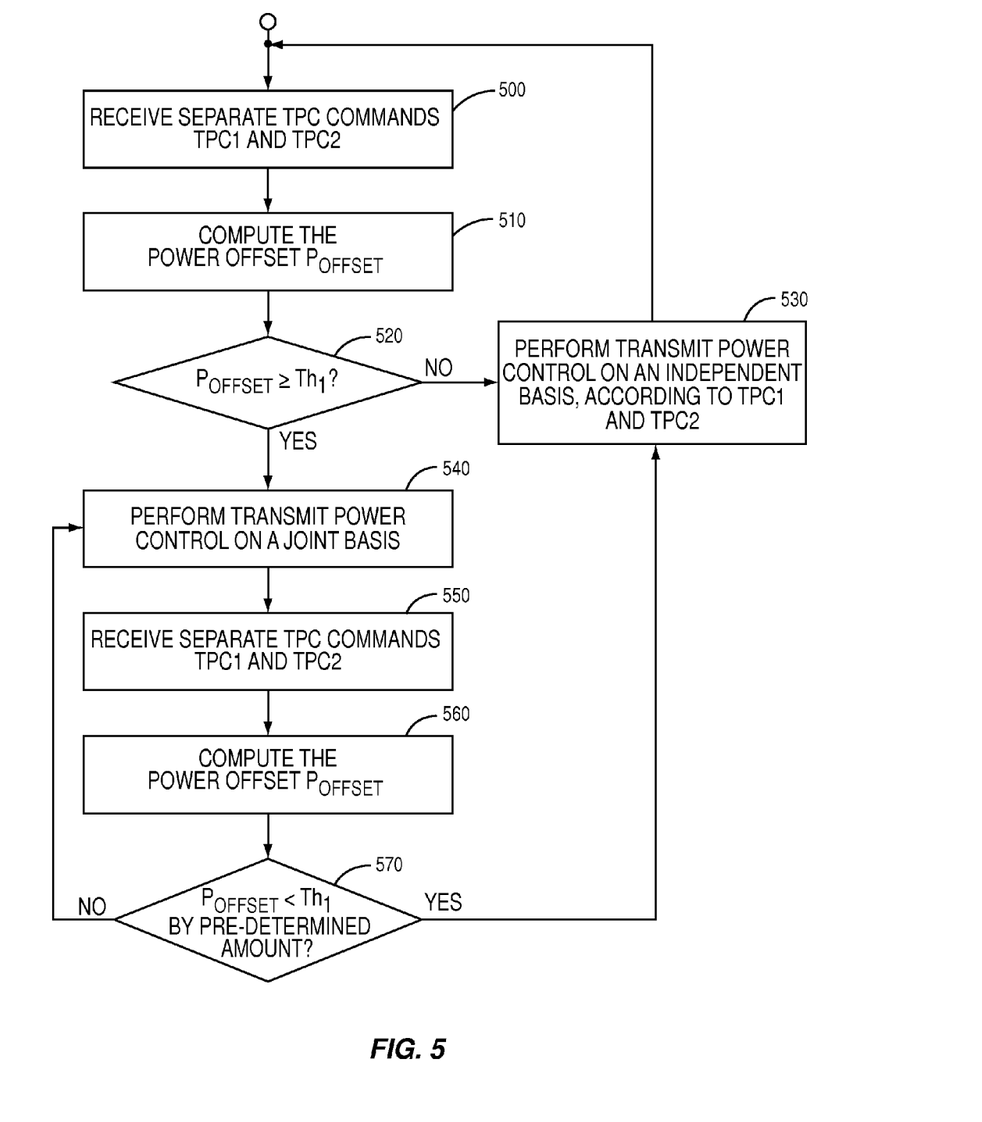
FIG. 5 is a logic flow diagram of a method of transmit power control according to one embodiment of the present invention.

Consider, for instance, FIG. 5. During one time slot (which, in general, refers herein to some periodic interval configured for transmit power control), the receiver 14 receives separate TPC commands $TPC_1$ and $TPC_2$ (Block 500). Based on those TPC commands, and if the commands are relative commands the transmit powers in the previous time slot, the TPC circuit(s) 16 compute the power offset $P_{OFFSET}$ (Block 510). If the computed power offset $P_{OFFSET}$ is not greater than or equal to the first pre-determined threshold $Th_1$ ("No" at Block 520), the TPC circuit(s) 16 perform transmit power control on an independent basis, according to $TPC_1$ and $TPC_2$ (Block 530). The transmit power control process then repeats itself in subsequent time slots (Blocks 500-530), on an independent basis, until the power offset $P_{OFFSET}$ becomes greater than or equal to the first pre-determined threshold $Th_1$. When the power offset $P_{OFFSET}$ becomes greater than or equal to the first pre-determined threshold $Th_1$ ("Yes" at Block 520), the TPC circuit(s) 16 perform transmit power control on a joint basis (Block 540).

During the next time slot(s), the receiver 14 again receives separate TPC commands $TPC_1$ and $TPC_2$ (Block 550) and the TPC circuit(s) 16 compute the power offset $P_{OFFSET}$ (Block 560). However, the TPC circuit(s) 16 only resume performing transmit power control on an independent basis if the computed power offset $P_{OFFSET}$ is less than the first pre-determined threshold $Th_1$ by a pre-determined amount ("Yes" at Block 570). Otherwise ("No" at Block 570), the TPC circuit(s) 16 continue performing transmit power control on a joint basis.

Figure 6:
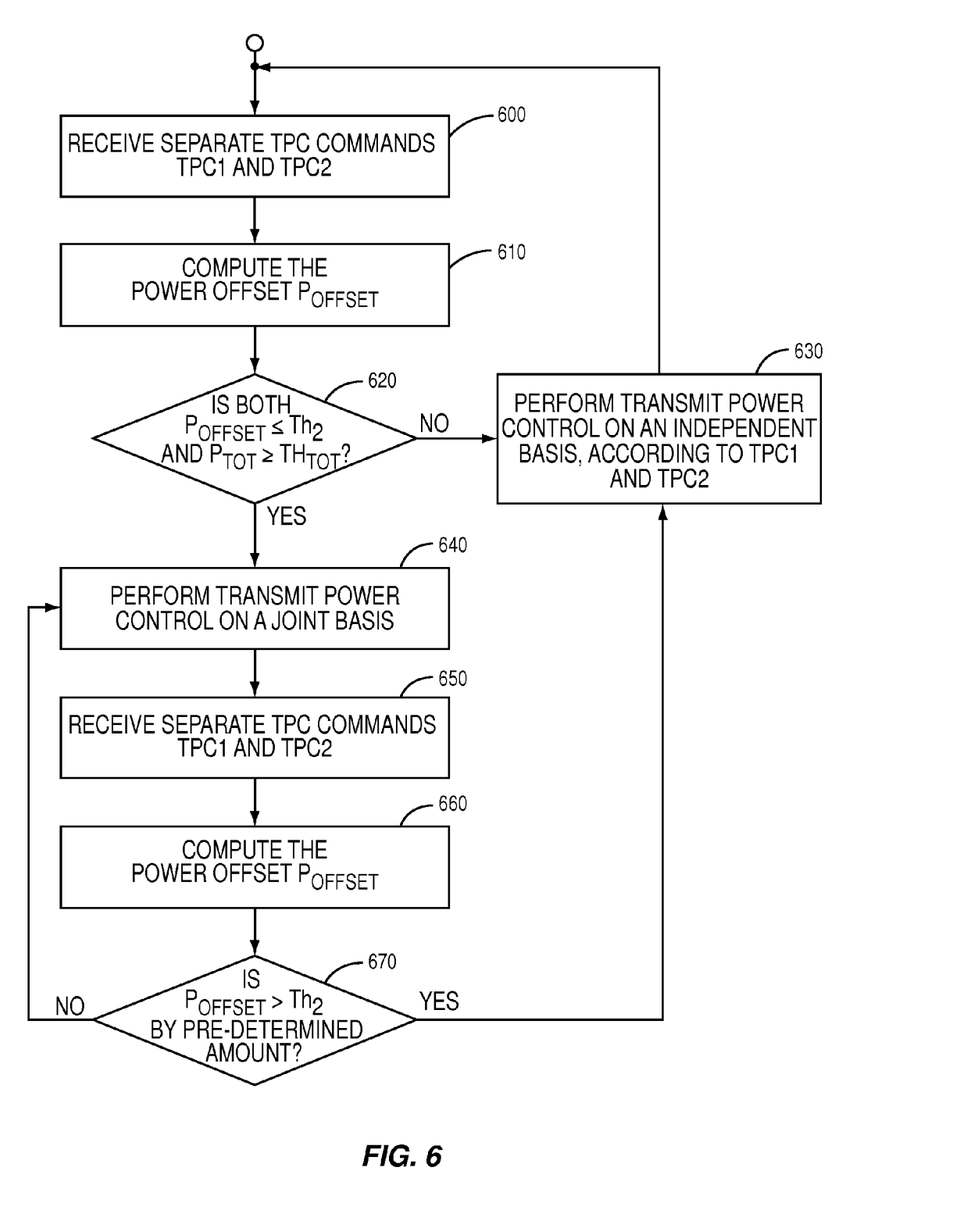
FIG. 6 is a logic flow diagram of a method of transmit power control according to another embodiment of the present invention.

FIG. 6 is similar to FIG. 5, except it illustrates hysteresis applied to other embodiments where the TPC circuit(s) 16 perform transmit power control on a joint basis if both (1) the computed power offset $P_{OFFSET}$ is less than or equal to the second pre-determined threshold $Th_2$; and (2) the total commanded power $P_{TOT}$ is greater than or equal to the total power threshold $Th_{TOT}$. As shown in FIG. 6, hysteresis is applied in such a way that the TPC circuit(s) 16 only resume performing transmit power control on an independent basis if the computed power offset $P_{OFFSET}$ is greater than the second pre-determined threshold $Th_2$ by a pre-determined amount ("Yes" at Block 670). While not shown, hysteresis could alternatively or additionally be applied so that the TPC circuit(s) 16 only resume performing transmit power control on an independent basis if the total commanded power $P_{TOT}$ is less than the total power threshold $Th_{TOT}$ by a pre-determined amount.

Those skilled in the art will appreciate that the transmit power control described above may occur in conjunction with or in addition to any power backoff applied once the total commanded power $P_{TOT}$ reaches a specified level. Furthermore, those skilled in the art will appreciate that while some of the above embodiments have been described with respect to only first and second communication channels (and first and second carriers), the present invention can be extended to any number of communication channels transmitted over any number of carriers. The communication channels in some embodiments include physical uplink channels from a mobile terminal 10 to a base station 20, but in other embodiments include physical downlink channels (e.g., in cellular topologies including relays, home node Bs, etc.) or communication channels in other network topologies where uplink and downlink are not necessarily defined.

Those skilled in the art will also appreciate that the various "circuits" described may refer to a combination of analog and digital circuits, including one or more processors configured with software and/or firmware (either of which may be stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Those skilled in the art will further appreciate that the mobile terminal 10 discussed herein may comprise a mobile telephone, a Portable Digital Assistant, a laptop computer, or the like. Moreover, those skilled in the art will appreciate that no particular communication interface standard is necessary for practicing the present invention. The mobile terminal 10, therefore, may be based on any one of a number of standardized communication implementations, including GSM, CDMA (IS-95, IS-2000), TDMA (TIA/EIA-136), wide band CDMA (W-CDMA), GPRS, long term evolution (LTE), or other type of wireless communication system.

Figure 7:
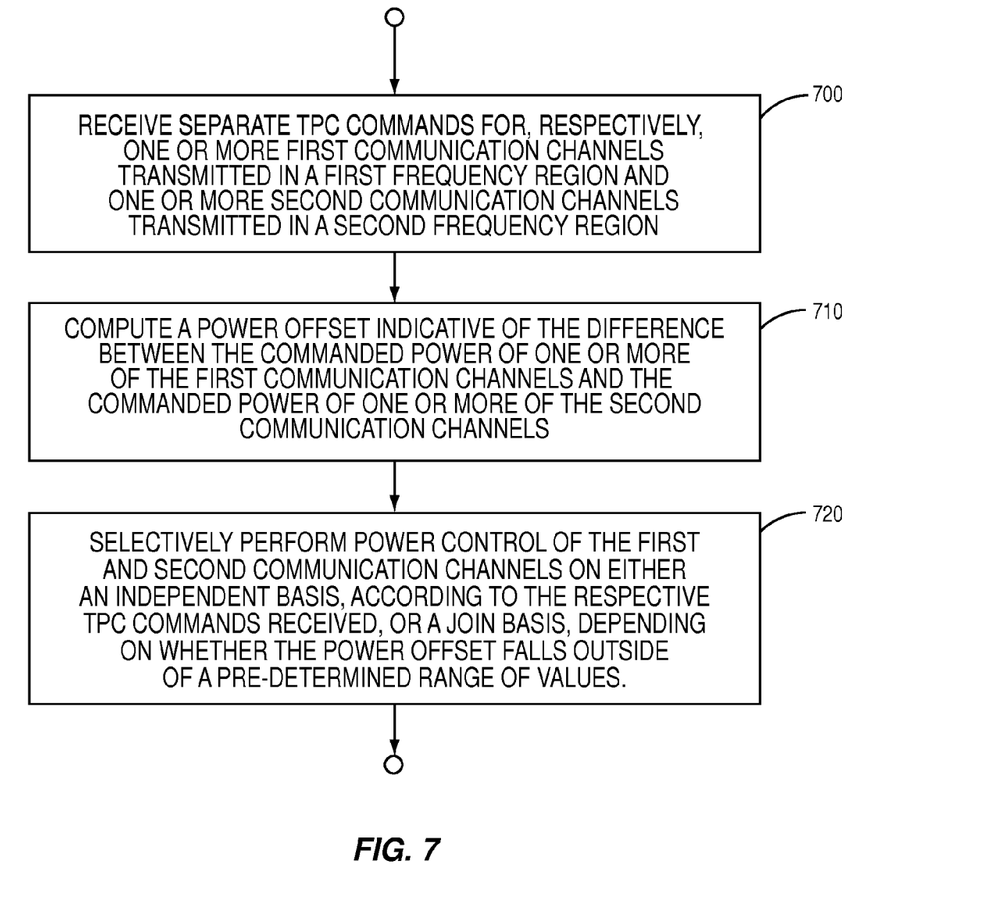
FIG. 7 is a logic flow diagram of a method of transmit power control according to yet another embodiment of the present invention.

With the above variations and modifications described above, those skilled in the art will readily appreciate that the mobile terminal 10 generally performs the method of transmit power control illustrated in FIG. 7. In FIG. 7, the mobile terminal 10 is configured to receive separate TPC commands $TPC_1$, $TPC_2$ for, respectively, one or more first communication channels $CH_1$ transmitted in a first frequency region and one or more second communication channels $CH_2$ transmitted in a second frequency region (Block 700). The mobile terminal 10 is further configured to compute a power offset $P_{OFFSET}$ indicative of the difference between the commanded power of one or more of the first communication channels $CH_1$ and the commanded power of one or more of the second communication channels $CH_2$ (Block 710). Finally, the mobile terminal 10 is configured to selectively perform transmit power control of the first and second communication channels $CH_1$, $CH_2$ on either an independent basis, according to the respective TPC commands $TPC_1$, $TPC_2$ received, or a joint basis, depending on whether the computed power offset $P_{OFFSET}$ falls outside of a pre-determined range of values (Block 720).

The present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

The invention claimed is:

1. A method of transmit power control implemented by a mobile terminal, the method comprising:
receiving separate transmit power control commands for, respectively, one or more first communication channels transmitted in a first frequency region and one or more second communication channels transmitted in a second frequency region;
computing a power offset indicative of the difference between the commanded power of one or more of the first communication channels and the commanded power of one or more of the second communication channels; and
selectively performing transmit power control of said first and second communication channels on either an independent basis, according to the respective transmit power control commands received, or a joint basis, by performing transmit power control on a joint basis if both the computed power offset falls below a pre-determined threshold value and the total power commanded across all, or substantially all, of the first and second communication channels exceeds a pre-determined total power threshold value, and otherwise performing transmit power control on an independent basis.

2. The method according to claim 1, wherein said one or more first communication channels comprise a Physical Uplink Control Channel (PUCCH) and said one or more second communication channels comprise a Physical Uplink Shared Channel (PUSCH).

3. The method according to claim 1, wherein performing transmit power control of said first and second communication channels on a joint basis comprises controlling the transmit power of said first and second communication channels according to the same transmit power control command.

4. The method according to claim 1, wherein said pre-determined threshold value depends on the first and second frequency regions.

5. The method according to claim 1, wherein performing transmit power control of said first and second communication channels on a joint basis comprises setting the transmit power of the weaker of the first and second communication channels to zero.

6. A mobile terminal comprising:
one or more transmitters configured to transmit one or more first communication channels in a first frequency region and one or more second communication channels in a second frequency region;
a receiver configured to receive separate transmit power control commands for said first and second communication channels; and
one or more transmit power control circuits configured to:
compute a power offset indicative of the difference between the commanded power of one or more of the first communication channels and the commanded power of one or more of the second communication channels; and
selectively perform transmit power control of said first and second communication channels on either an independent basis, according to the respective transmit power control commands received, or a joint basis, by performing transmit power control on a joint basis if both the computed power offset falls below a pre-determined threshold value and the total power commanded across all, or substantially all, of the first and second communication channels exceeds a pre-determined total power threshold value, and otherwise performing transmit power control on an independent basis.

7. The mobile terminal according to claim 6, wherein said one or more first communication channels comprise a Physical Uplink Control Channel (PUCCH) and said one or more second communication channels comprise a Physical Uplink Shared Channel (PUSCH).

8. The mobile terminal according to claim 6, wherein the one or more transmit power control circuits are configured to perform transmit power control of said first and second communication channels on a joint basis by controlling the transmit power of said first and second communication channels according to the same transmit power control command.

9. The mobile terminal according to claim 6, wherein said pre-determined threshold value depends on the first and second frequency regions.

10. The mobile terminal according to claim 6, wherein the one or more transmit power control circuits are configured to perform transmit power control of said first and second communication channels on a joint basis by setting the transmit power of the weaker of the first and second communication channels to zero.

11. A method of transmit power control implemented by a mobile terminal, the method comprising:
receiving separate transmit power control commands for, respectively, one or more first communication channels transmitted in a first frequency region and one or more second communication channels transmitted in a second frequency region;
computing a power offset indicative of the difference between the commanded power of one or more of the first communication channels and the commanded power of one or more of the second communication channels;
selectively performing transmit power control of said first and second communication channels on either an independent basis, if the computed power offset falls below a first threshold and exceeds a second threshold that is lower than the first threshold, according to the respective transmit power control commands received, or a joint basis, if the computed power offset is below the second threshold or exceeds the first threshold.

12. A mobile terminal comprising:
one or more transmitters configured to transmit one or more first communication channels in a first frequency region and one or more second communication channels in a second frequency region;
a receiver configured to receive separate transmit power control commands for said first and second communication channels; and
one or more transmit power control circuits configured to:
compute a power offset indicative of the difference between the commanded power of one or more of the first communication channels and the commanded power of one or more of the second communication channels; and
selectively perform transmit power control of said first and second communication channels on either an independent basis, if the computed power offset falls below a threshold and exceeds a second threshold that is lower than the first threshold, according to the respective transmit power control commands received, or a joint basis, if the computed power offset is below the second threshold or exceeds the first threshold.

* * * * *